United States Patent Office 3,442,629
Patented May 6, 1969

3,442,629
PHOSPHONITRILIC POLYMERS
Daniel J. Jaszka, Tonawanda, N.Y., assignor to Hooker Chemicals Corporation, Niagara Falls, N.Y., a corporation of New York
No Drawing. Original application Mar. 2, 1964, Ser. No. 348,877. Divided and this application Jan. 3, 1967, Ser. No. 660,845
Int. Cl. C01b 21/54
U.S. Cl. 23—357    4 Claims

ABSTRACT OF THE DISCLOSURE

A polymer, useful as construction, gasketing and covering materials in machines and articles subjected to high temperatures and humidities, characterized by high hydrolytic stability and heat resistance which is the heat polymerized product of a cyclotriphosphazatriene of the formula,

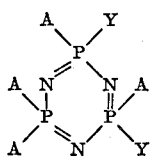

wherein A is selected from the group consisting of chlorine and phenoxy; and, Y is selected from the group consisting of —NH$_2$, —N=PCl$_3$, —N=P(C$_6$H$_5$O)$_3$ and —N=P(C$_6$H$_5$)$_3$ and A is phenoxy when Y is —NH$_2$.

---

This is a division of the parent application Ser. No. 348,877, filed Mar. 2, 1964, now U.S. 3,392,214.

This invention relates to cyclophosphazene products, including polymers thereof, and to processes for preparing them.

The prior art discloses that cyclophosphazene polymers which have good thermal stability have been made but often such polymers are not as hydrolytically stable as is desirable. In fact, many such polymers have a very rapid hydrolysis rate. Therefore, it is very desirable to find a cyclophosphazene derivative which can be reacted to produce a polymer which has both good thermal stability and enhanced hydrolytic stability. Such products are useful as materials of construction for formed articles, such as structural parts, covers, gaskets or plastic consumer articles subjected to heat and high humidities, and may be employed with other plastics or polymers in molding compositions. Such products are described in this application.

In accordance with this invention there is provided such a product and a process for preparing it, a cyclophosphazene polymer of increased hydrolytic stability, which comprises reacting diaminocyclophosphazene, (preferably trimeric) with a phosphorus chloride selected from the group consisting of phosphorus pentachloride, triphenoxy phosphorus dichloride and triphenyl phosphorus dichloride, and recovering the resulting product, which may thereafter be polymerized to a useful polymer. Additionally, the process of this invention includes reacting diaminocyclophosphazene with phenol to form a phenolated diaminocyclophosphazene compound, which may be treated with a phosphorus chloride and polymerized.

The exact structure of some of the new intermediate products and final polymers produced by the processes of this invention, has not been definitively established. However, it is believed that the following equations constitute correct representations of the reactions effected and the products formed according to this invention.

Compounds II, III, V, VII, IX, XI, and XIII may be considered cyclotriphosphazatriene of the formula, wherein A is selected from the group consisting of chlorine and phenoxy; and, Y is selected from the group consisting of —NH$_2$, —N=PCl$_3$, —N=P(C$_6$H$_5$O)$_3$ and —N=P(C$_6$C$_5$)$_3$, and A is phenoxy when Y is —NH$_2$.

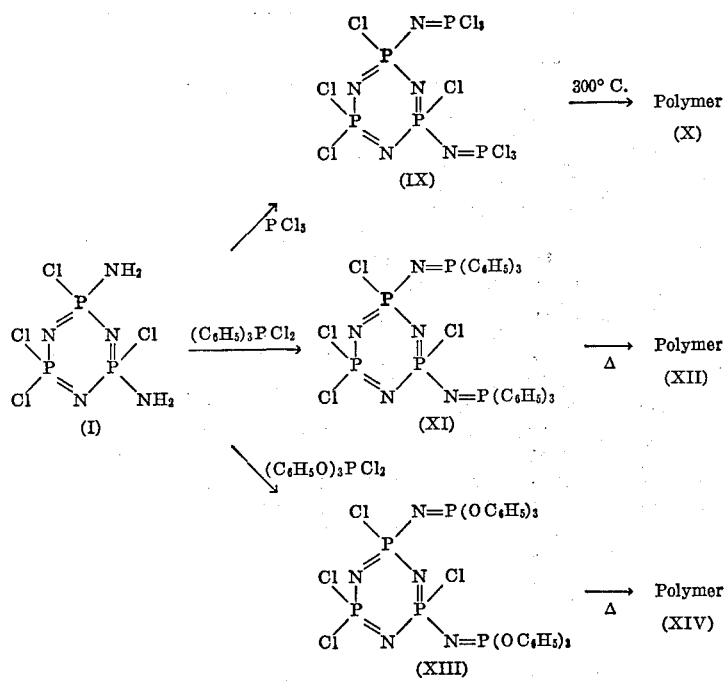

It will be convenient in the balance of this specification to refer to these compounds by the assigned identifying Roman numerals. The type of compound shown herein is often described as a phosphonitrilic halide derivative. However, this term is less descriptive than the term phosphazene, since nitrile implies a —C=N— bond, whereas the compounds of this invention have no such bonds. Using the phosphazane nomenclature, these compounds are named as follows:

I.—2,2,4,6-tetrachloro-4,6-diaminocyclotriphosphazatriene;
II.—2,2,4,6-tetraphenoxy-4,6-diaminocyclotriphosphazatriene;
III.—2,2,4,6-tetraphenoxy-4,6-di(trichlorophosphazo) cyclotriphosphazatriene;
V.—2,2,4,6-tetraphenoxy-4,6-di(triphenylphosphazo) cyclotriphosphazatriene;
VII.—2,2,4,6-tetraphenoxy-4,6-di(triphenoxyphosphazo) cyclotriphosphazatriene;
IX.—2,2,4,6-tetrachloro-4,6-di(trichlorophosphazo) cyclotriphosphazatriene;
XI.—2,2,4,6-tetrachloro-4,6-di(triphenylphosphazo) cyclotriphosphazatriene;
XIII.—2,2,4,6-tetrachloro-4,6-di(triphenoxyphosphazo) cyclotriphosphazatriene.

The diaminohalophosphazene starting material, Compound I, is conveniently prepared by aminolysis of cyclicphosphazene chloride according to the method of De Ficquelmont, A.M., Ann. chim., 12,169 (1939).

It is desirable to prepare the monomeric products of this invention, Compounds III, V, VII, IX, XI and XIII and Intermediate II in an organic reaction medium. It is preferable in the case of preparation of the aforementioned monomers to use a chlorinated solvent, such as monochlorobenzene, trichlorobenzene, orthodichlorobenzene, symmetrical-tetrachloroethane, tetrachloroethylene, benzyl chloride, chloroform and carbon tetrachloride. In addition to the foregoing list of chlorinated solvents, Compound II may also be satisfactorily prepared from non-halogenated aromatic solvents, such as paraxylene. While the solvent used may be at least partially dependent upon such factors as cost, toxicity and compatability with the reaction equipment employed, it is preferable that the lower boiling point solvents be used, i.e., those boiling up to about 150 degrees centigrade, so as to keep the reaction temperature low and avoid premature polymerization of the phosphazene molecule. The monomers are prepared by reacting a stoichiometric amount or a slight excess of phosphorus chloride with the desired phosphazene molecule, preferably in a halogenated solvent. The reaction is continued under reflux conditions until the cessation of hydrogen chloride evolution. Thereafter, the reaction product is filtered and is freed of solvent by distillation. It is preferable that the solvent be distilled under vacuum conditions. Pressures of 5 to 10 millimeters of mercury and lower are satisfactory.

To make the intermediate product, Compound II, an excess of phenol as an alkali salt thereof is employed to insure complete phenolation of the product. While it is preferable to use potassium hydroxide to form the phenate, other alkali metal hydroxides, such as sodium hydroxide, are also suitable. The reaction is completed when the distillation of water ceases. The reaction mixture is then cooled and neutralized with alkali, such as potassium hydroxide, and dried with anhydrous sodium sulfate. Thereafter, the solvent is removed by distillation.

The monomers of this invention, Compounds III, V, VII, IX, XI, and XIII are heated in the absence of oxygen until polymerized. Preferably the monomers are heated at a temperature from 200 to about 400 degrees centigrade, for a period of about one-half hour to thirty hours. The resulting polymers are characterized by their excellent hydrolytic stability and heat resisting properties.

The invention is illustrated by the following non-limiting examples. Temperatures are expressed in degrees centigrade and parts are by weight unless otherwise indicated.

EXAMPLE 1

To a reaction vessel containing 344 parts p-xylene and equipped with a water-cooled condenser were charged 48 parts of the prior art compound (Compound I), 61 parts of phenol and 53 parts of potassium hydroxide (85 percent). The mixture was refluxed at about 155 degrees centigrade for about 10 hours, the HCl being then removed, after which water was distilled off. After the distillation of water had ceased, the reaction mixture was cooled and was successively treated with 5 percent aqueous potassium hydroxide and 5 percent aqueous sodium sulfate solution. This treatment produced two layers of liquid. The water layer was removed and the xylene solution was dried over sodium sulfate and was distilled at reduced pressure. Forty-two parts of an oily residue were isolated, which residue slowly crystallized. Recrystallization from 95 percent ethanol yielded white needle-like crystals having a melting point of 105.5–106 degrees centigrade.

For $P_3N_3(OC_6H_5)_4(NH_2)_2$(II):

|  | Phosphorus | Carbon | Hydrogen | Nitrogen |
|---|---|---|---|---|
| Calculated percent | 17.2 | 53.4 | 4.5 | 13.0 |
| Found percent | 17.6 | 53.6 | 4.4 | 12.7 |

EXAMPLE 2

To a reaction vessel containing 225 parts monochlorobenzene and equipped with water-cooled condenser were charged 46 parts of Compound I and 62 parts of phosphorus dichloride $(C_6H_5O)_3PCl_2$, to form Compounds 135 degrees centigrade for about 4 hours, with the evolution of hydrogen chloride. The reaction mixture was filtered and the clear liquid was distilled at a reduced pressure to yield 86 parts of yellow viscous oil considered to have the formula of Compound IX.

EXAMPLE 3

To a reaction vessel containing 135 parts of monochlorobenzene and equipped with a water cooled condenser were charged 27 parts of the product of Example 1 (II) and 22 parts of phosphorus pentachloride. The mixture was refluxed at about 135 degrees centigrade until the evolution of hydrogen chloride ceased. Thereafter, the monochlorobenzene was removed by distillation at a pressure of about 50 millimeters of mercury and 135 degrees centigrade to yield 39 parts of a yellow viscous oil considered to have the structure of Compound III.

Analogous products are obtained when Compounds I and II, respectively, are reacted under the same conditions with equivalent molar proportions of triphenoxy phosphorus dichloride $(C_6H_5O)_3PCl_2$, to form Compounds XIII and \ II, respectively. Likewise, under the same conditions, the reaction of triphenylphosphorusdichloride $(C_6H_5)_3PCl_2$ with Compounds I and II, respectively, yields Compounds XI and V, respectively, as exemplified by Example 4.

EXAMPLE 4

To a reaction vessel containing 90 parts of monochlorobenzene and equipped with a water-cooled condenser were charged 13.4 parts of the product of Example 1 (II), and 19.7 parts of triphenylphosphorusdichloride $(C_6H_5)_3PCl_2$ The mixture was refluxed until the evolution of hydrogen chloride ceased. Thereafter, the monochlorobenzene was removed by distillation at 135 degrees centigrade and at a reduced pressure of about 50 millimeters of mercury to yield 31 parts of a yellow viscous oil considered to have the structure of Compound V.

EXAMPLE 5

Ten grams of the oily monomer of Example 3 was polymerized to a rubber polymer by heating it in a sealed tube placed in a molten bath held at 300 degrees centigrade for 4 hours. The rubber was very elastic and remained stable on exposure to a moist atmosphere, retaining appreciable elasticity after one month of such exposure. Differential thermal analysis on the rubber showed no major change up to a temperature of about 415 degrees centigrade.

EXAMPLE 6

Five grams of the oily monomer of Example 4 was polymerized to a useful resinous polymer by heating about 10 parts of it in a sealed tube placed in a molten bath held at 400 degrees centigrade for 24 hours.

EXAMPLE 7

Ten grams of the oily monomer of Example 2 was polymerized to a rubber polymer by heating it in a sealed tube placed in a molten bath held at 300 degrees centigrade for 1 hour. The rubber resulting was found to be stable on exposure to moist atmosphere, retaining appreciable elasticity after one month's exposure.

These and the products of Examples 5–7 are useful construction, gasketing and covering materials in machines and articles subjected to high temperatures and humidities.

Various changes and modifications may be made in the method of this invention and in the products thereof. Certain preferred forms have been described but equivalents may be substituted without departing from the spirit and scope of this invention.

What is claimed is:

1. A polymer characterized by high hydrolytic stability and heat resistance which is the heat polymerized product of a cyclotriphosphazatriene of the formula

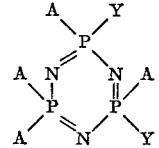

wherein A is selected from the group consisting of chlorine and phenoxy; and, Y is selected from the group consisting of —NH$_2$, —N=PCl$_3$, —N=P(C$_6$H$_5$O)$_3$ and —N=P(C$_6$H$_5$)$_3$ and A is phenoxy when Y is —NH$^2$.

2. The polymer of claim 1 when the cyclotriphosphazatriene is 2,2,4,6-tetrachloro-4,6-di(trichlorophosphazo)cyclotriphosphazatriene.

3. The polymer of claim 1 when the cyclotriphosphazatriene is 2,2,4,6-tetraphenoxy-4,6-di(trichlorophosphazo)cyclotriphosphazatriene.

4. The polymer of claim 1 when the cyclotriphosphazatriene is 2,2,4,6-tetraphenoxy-4,6-di(triphenylphosphazo)cyclotriphosphazatriene.

References Cited

UNITED STATES PATENTS 2,872,283 3/1959 Taylor _____ 23—357
3,234,273 3/1966 Rice et al.

OTHER REFERENCES

Fitzsimmons et al.: Phosphorus-Nitrogen Compounds, etc., Chemical Society Journal, pp. 4799–4802, (1965).

OSCAR R. VERTIZ, *Primary Examiner.*

HOKE S. MILLER, *Assistant Examiner.*

U.S. Cl. X.R.

260—543

UNITED STATES PATENT OFFICE

CERTIFICATE OF CORRECTION

Patent No. 3,442,629  May 6, 1969

Daniel J. Jaszka

It is certified that error appears in the above identified patent and that said Letters Patent are hereby corrected as shown below:

Column 2, line 72, the formula "$-N=P(C_6C_5)_3$," should read -- $-N=P(C_6H_5)_3$, --. Column 5, line 16, "dichloride $(C_6H_5O)_3PCl_2$, to form Compounds" should read -- pentachloride. The mixture was refluxed at about --. Column 6, line 40, Claim 1, the formula "$-NH^2$." should read -- $-NH_2$. --.

Signed and sealed this 16th day of June 1970.

(SEAL)
Attest:

Edward M. Fletcher, Jr.  WILLIAM E. SCHUYLER, JR.
Attesting Officer  Commissioner of Patents